United States Patent
Oren et al.

(10) Patent No.: US 9,801,039 B2
(45) Date of Patent: *Oct. 24, 2017

(54) APPARATUS, SYSTEM AND METHOD OF COMMUNICATION DATA BETWEEN AWARENESS NETWORKING DEVICES

(71) Applicant: INTEL CORPORATION, Santa Clara, CA (US)

(72) Inventors: Elad Oren, Tel Aviv (IL); Emily H. Qi, Camas, WA (US); Ofer Hareuveni, Haifa (IL)

(73) Assignee: INTEL CORPORATION, Santa Clara, CA (US)

(*) Notice: Subject to any disclaimer, the term of this patent is extended or adjusted under 35 U.S.C. 154(b) by 81 days.

This patent is subject to a terminal disclaimer.

(21) Appl. No.: 14/670,503

(22) Filed: Mar. 27, 2015

(65) Prior Publication Data
US 2016/0205529 A1  Jul. 14, 2016

Related U.S. Application Data

(60) Provisional application No. 62/100,991, filed on Jan. 8, 2015.

(51) Int. Cl.
*H04W 8/00*  (2009.01)
(52) U.S. Cl.
CPC ................... *H04W 8/005* (2013.01)
(58) Field of Classification Search
CPC .................................. H04W 8/0005
See application file for complete search history.

(56) References Cited

U.S. PATENT DOCUMENTS

| | | | |
|---|---|---|---|
| 8,687,546 B2* | 4/2014 | Gong | H04L 1/1685 370/328 |
| 8,824,440 B2* | 9/2014 | Ghosh | H04W 28/14 370/338 |
| 8,971,229 B1* | 3/2015 | Yenganti | H04W 52/0216 370/311 |
| 9,060,293 B1* | 6/2015 | Vivanco | H04W 52/262 |

(Continued)

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Parth Patel
(74) *Attorney, Agent, or Firm* — Shichrur & Co.

(57) ABSTRACT

Some demonstrative embodiments include apparatuses, systems and/or methods of communicating data between awareness networking devices. For example, an apparatus may include logic and circuitry configured to cause a first wireless device to transmit a service discovery frame in a Discovery Window (DW), the service discovery frame including an information element (IE) and availability information, the IE including one or more identifiers to identify one or more second wireless devices, and the availability information indicating at least one channel and at least one time slot after the DW; and to transmit data to the one or more second wireless devices over the channel and during the time slot.

22 Claims, 4 Drawing Sheets

(56) References Cited

U.S. PATENT DOCUMENTS

| | | | |
|---|---|---|---|
| 9,143,979 B1* | 9/2015 | Lambert | H04W 28/0289 |
| 2005/0249227 A1* | 11/2005 | Wang | H04L 47/10 |
| | | | 370/412 |
| 2008/0069021 A1* | 3/2008 | Chhabra | H04M 1/7253 |
| | | | 370/311 |
| 2008/0130603 A1* | 6/2008 | Wentink | H04W 74/085 |
| | | | 370/338 |
| 2011/0093536 A1 | 4/2011 | Wentink | |
| 2012/0082127 A1* | 4/2012 | Wu | H04W 8/005 |
| | | | 370/330 |
| 2012/0134349 A1 | 5/2012 | Jung et al. | |
| 2013/0121256 A1* | 5/2013 | Backes | H04W 84/18 |
| | | | 370/329 |
| 2014/0056220 A1* | 2/2014 | Poitau | H04W 40/246 |
| | | | 370/328 |
| 2014/0064160 A1* | 3/2014 | Verger | H04W 72/14 |
| | | | 370/311 |
| 2014/0126417 A1* | 5/2014 | Kang | H04W 8/005 |
| | | | 370/254 |
| 2015/0016322 A1* | 1/2015 | Yenganti | H04W 40/005 |
| | | | 370/311 |
| 2015/0109961 A1* | 4/2015 | Patil | H04W 4/206 |
| | | | 370/254 |
| 2015/0109981 A1* | 4/2015 | Patil | H04L 67/1078 |
| | | | 370/311 |
| 2015/0139203 A1* | 5/2015 | Miryala | H04W 28/0263 |
| | | | 370/338 |
| 2015/0172391 A1* | 6/2015 | Kasslin | H04L 67/16 |
| | | | 370/338 |
| 2015/0172757 A1 | 6/2015 | Kafle et al. | |
| 2015/0181521 A1* | 6/2015 | Kwon | H04W 52/0216 |
| | | | 370/311 |
| 2015/0319675 A1* | 11/2015 | Park | H04W 48/16 |
| | | | 370/338 |
| 2016/0100361 A1* | 4/2016 | Zheng | H04W 52/0216 |
| | | | 455/522 |
| 2016/0119738 A1* | 4/2016 | Hampel | H04W 8/005 |
| | | | 370/329 |
| 2016/0127459 A1* | 5/2016 | Qi | H04L 67/104 |
| | | | 370/312 |
| 2016/0142994 A1* | 5/2016 | Luo | H04W 56/0015 |
| | | | 370/328 |
| 2016/0157089 A1* | 6/2016 | Qi | H04W 76/046 |
| | | | 370/254 |
| 2016/0157193 A1* | 6/2016 | Qi | H04W 56/00 |
| | | | 370/350 |
| 2016/0165653 A1* | 6/2016 | Liu | H04W 76/023 |
| | | | 370/329 |
| 2016/0174136 A1 | 6/2016 | Patil et al. | |
| 2016/0205616 A1* | 7/2016 | Oren | H04W 4/08 |
| | | | 370/254 |
| 2016/0212606 A1* | 7/2016 | Qi | H04W 4/08 |

OTHER PUBLICATIONS

Wi-Fi Alliance, Wi-Fi Peer-to-Peer (P2P) Technical Specification Version 1.5, Aug. 4, 2014, 183 pages.
Office Action for U.S. Appl. No. 14/670,621, mailed on Jun. 15, 2016, 14 pages.
Office Action for U.S. Appl. No. 14/670,513, mailed on Jan. 12, 2017, 29 pages.
Office Action for U.S. Appl. No. 14/670,513, dated Jul. 11, 2017, 29 pages.

* cited by examiner

APPARATUS, SYSTEM AND METHOD OF COMMUNICATION DATA BETWEEN AWARENESS NETWORKING DEVICES

CROSS REFERENCE

This application claims the benefit of and priority from U.S. Provisional Patent Application No. 62/100,991 entitled "Apparatus, System and Method of Communicating Data Between Awareness Networking Devices", filed Jan. 8, 2015, the entire disclosure of which is incorporated herein by reference.

TECHNICAL FIELD

Embodiments described herein generally relate to communicating data between awareness networking devices.

BACKGROUND

In some wireless communication networks, communication may be performed during discovery windows (DWs).

Stations may be allowed to transmit a discovery frame during a DW, in order to enable the stations to discover other devices or services that are running on the other devices.

Transmissions may be preformed during the DW based on a contention mechanism.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
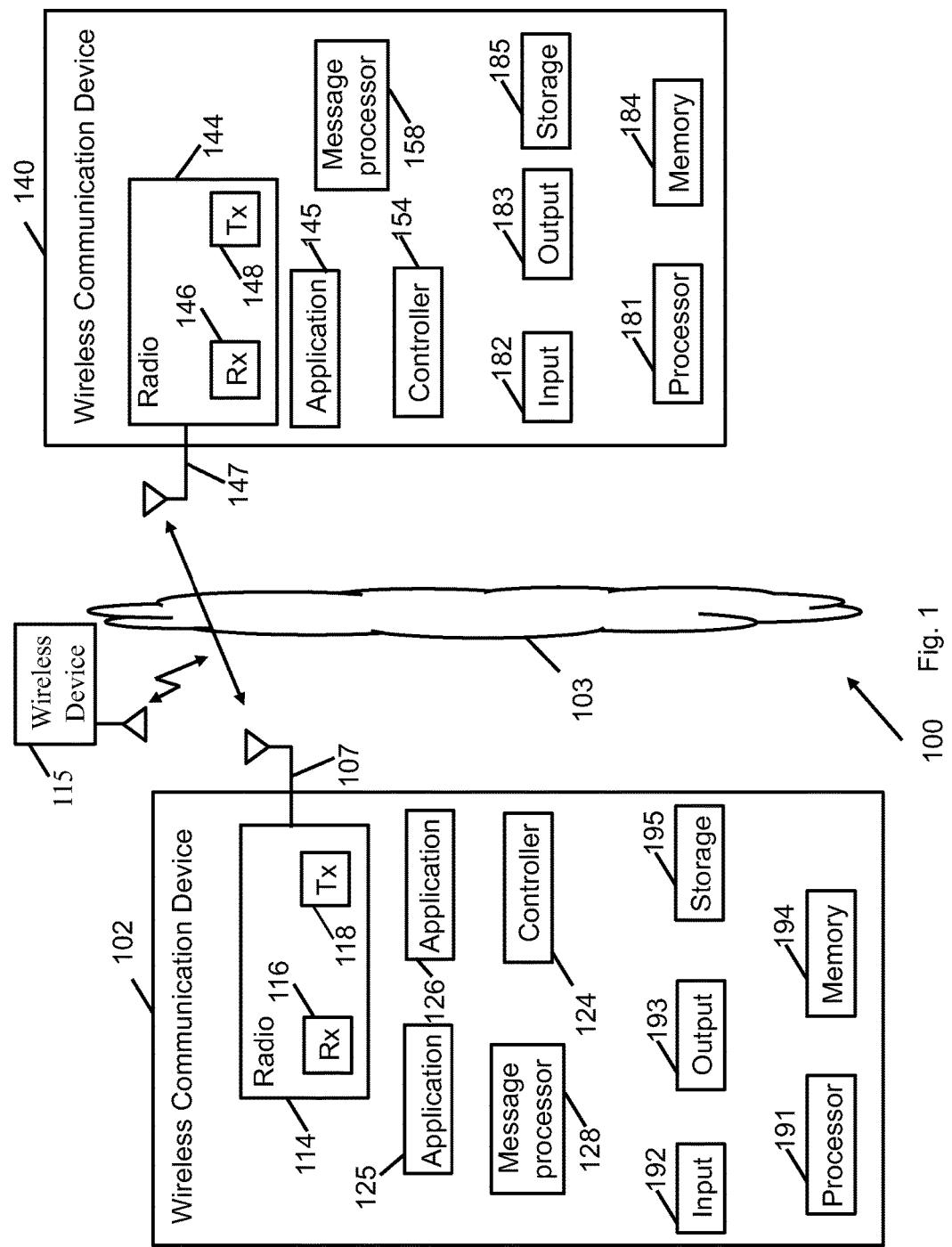
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with devices and/or networks operating in accordance with existing Wireless Fidelity (WiFi) Alliance (WFA) Specifications (including WFA Neighbor Awareness Networking (NAN) Specification) and/or future versions and/or derivatives thereof, devices and/or networks operating in accordance with existing WFA Peer-to-Peer (P2P) specifications (WiFi P2P technical specification, version 1.2, 2012) and/or future versions and/or derivatives thereof, devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); and/or IEEE-802.11REVmc ("IEEE 802.11-REVmc™/ D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification")) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a QoS basic service set (BSS), a tunneled direct-link setup (TDLS) link, a STA-to-STA communication in an independent basic service set (IBSS), or the like.

Some demonstrative embodiments are described herein with respect to WiFi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102, 115, and/or 140.

In some demonstrative embodiments, wireless communication devices 102, 115, and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 and/or device 115 may include, for example, one or more of a processor 191, an input unit 192, an output unit 193, a memory unit 194, and a storage unit 195; and/or device 140 may include, for example, one or more of a processor 181, an input unit 182, an output unit 183, a memory unit 184, and a storage unit 185. Devices 102 and/or 140 may optionally include other suitable hardware components and/or software components. In some demonstrative embodiments, some or all of the components of one or more of devices 102, 115 and/or 140 may be enclosed in a common housing or packaging, and may be interconnected or operably associated using one or more wired or wireless links. In other embodiments, components of one or more of devices 102, 115 and/or 140 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units.

Memory unit 194 and/or storage unit 195, for example, may store data processed by device 102. Memory unit 184 and/or storage unit 185, for example, may store data processed by device 140.

In some demonstrative embodiments, wireless communication devices 102, 115 and/or 140 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wireless Fidelity (WiFi) channel, an IR channel, a Bluetooth (BT) channel, and the like.

In some demonstrative embodiments, wireless communication medium 103 may include a wireless communication channel over a 2.4 Gigahertz (GHz) frequency band, a 5 GHz frequency band, a millimeterWave (mmWave) frequency band, e.g., a 60 GHz frequency band, a Sub 1 Gigahertz (S1G) band, and/or any other frequency band.

In some demonstrative embodiments, devices 102, 115 and/or 140 may include one or more radios including circuitry and/or logic to perform wireless communication between devices 102, 140 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may be configured to communicate over a 2.4 GHz band, a 5 GHz band, a mmWave band, a S1G band, and/or any other band.

In some demonstrative embodiments, radios 114 and/or 144 may include circuitry and/or logic, modulation elements, demodulation elements, amplifiers, analog to digital and digital to analog converters, filters, and/or the like. In one example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In other example, device 102 may include two or more antennas 107.

In one example, device 140 may include a single antenna 147. In other example, device 140 may include two or more antennas 147.

Antennas 107 and/or 147 may include any type of antennas suitable to transmit and/or receive wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, wireless communication devices 102, 115 and/or 140 may form, and/or may communicate as part of, a wireless local area network (WLAN).

In some demonstrative embodiments, wireless communication devices 102, 115 and/or 140 may form, and/or may communicate as part of, a WiFi network.

In some demonstrative embodiments, wireless communication devices 102, 115 and/or 140 may form, and/or may communicate as part of, a WiFi Direct (WFD) network, e.g., a WiFi direct services (WFDS) network, and/or may perform the functionality of one or more WFD devices.

In one example, device 102, 115 and/or device 140 may include, or may perform the functionality of a WiFi Direct device.

In some demonstrative embodiments, wireless communication devices 102, 115 and/or 140 may be capable of performing awareness networking communications, for example, according to an awareness protocol, e.g., a WiFi aware protocol, and/or any other protocol, e.g., as described below.

In some demonstrative embodiments, wireless communication devices 102, 115 and/or 140 may include an awareness networking device.

In some demonstrative embodiments, wireless communication devices 102, 115 and/or 140 may be capable of forming, and/or communicating as part of, a Neighbor Awareness Networking (NAN) network, e.g., a WiFi NAN, and/or may perform the functionality of one or more NAN devices.

In some demonstrative embodiments, wireless communication devices 102, 115 and/or 140 may include a NAN device.

In other embodiments, wireless communication devices 102, 115 and/or 140 may include any other wireless devices.

In some demonstrative embodiments, wireless communication medium 103 may include a direct link, for example, a PTP link, e.g., a WiFi direct P2P link, for example, to enable direct communication between device 102 and device 140.

In some demonstrative embodiments, wireless communication devices 102, 115 and/or 140 may perform the functionality of WFD P2P devices. For example, devices 102, 115 and/or 140 may be able to perform the functionality of a P2P client device, and/or P2P group Owner (GO) device.

In other embodiments, wireless communication devices 102, 115 and/or 140 may form, and/or communicate as part of, any other network and/or perform the functionality of any other wireless devices or stations.

In some demonstrative embodiments, devices 102, 115 and/or 140 may include one or more applications configured to provide, share, and/or to use one or more services, e.g., a social application, a file sharing application, a media application and/or the like, for example, using an awareness network, NAN network, a PTP network, a P2P network, WFD network, or any other network.

In some demonstrative embodiments, device 102 may execute an application 125 and/or an application 126. In some demonstrative embodiments, device 140 may execute an application 145.

In some demonstrative embodiments, devices 102, 115 and/or 140 may be capable of sharing, showing, sending, transferring, printing, outputting, providing, synchronizing, and/or exchanging content, data, and/or information, e.g., between application 154 and applications 125 and/or 126.

In some demonstrative embodiments, devices 102, 115 and/or 140 may include a controller configured to control one or more functionalities of devices 102, 115 and/or 140, for example, one or more functionalities of communication, e.g., awareness networking communications, NAN communication and/or any other communication, between devices 102, 115 and/or 140 and/or other devices, and/or any other functionality, e.g., as described below. For example, device 102 may include a controller 124, and/or device 140 may include a controller 154.

In some demonstrative embodiments, controllers 124 and/or 154 may include circuitry, e.g., processor circuitry, memory circuitry, Media-Access Control (MAC) circuitry, Physical Layer (PHY) circuitry, and/or any other circuitry, configured to perform the functionality of controllers 124 and/or 154. Additionally or alternatively, one or more functionalities of controllers 124 and/or 154 may be implemented by logic, which may be executed by a machine and/or one or more processors, e.g., as described below. In one example, controllers 124 and/or 154 may include one or more processors having circuitry to cause a device or a station, e.g., devices 102 and/or 140, to perform one or more functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry, e.g., processor circuitry, memory circuitry, Media-Access Control (MAC) circuitry, Physical Layer (PHY) circuitry, and/or any other circuitry, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 104.

In some demonstrative embodiments, devices 102, 115 and/or 140 may perform the functionality of a device or station, for example, an awareness networking device, a NAN device, a WiFI device, a WFD device, a WLAN device and/or any other device, capable of discovering other devices according to a discovery protocol and/or scheme.

In some demonstrative embodiments, radios 114 and/or 144 may communicate over wireless communication medium 103 according to an awareness networking scheme, for example, a discovery scheme, for example, a NAN discovery scheme, or any other awareness networking and/or discovery scheme, e.g., as described below.

In some demonstrative embodiments, the awareness networking scheme, e.g., NAN, may enable applications to discover services in their close proximity. For example, the NAN technology may be a low power service discovery, which may, for example, scale efficiently, e.g., in dense Wi-Fi environments.

In some demonstrative embodiments, a device, e.g., device 102, device 115, and/or device 140, may include one or more blocks and/or entities to perform network awareness functionality. For example, devices 102, 115 and/or 140 may include a NAN MAC and/or a Discovery Engine (DE). In one example, controllers 124 and/or 154 may be configured to perform the functionality of the NAN MAC and/or the Discovery Engine. In another example, the functionality of the NAN MAC and/or the Discovery Engine may be performed by any other element and/or entity of devices 102, 115 and/or 140.

In some demonstrative embodiments, the awareness networking scheme may include a discovery scheme or protocol, e.g., as described below.

In some demonstrative embodiments, devices 102, 115 and/or 140 may perform a discovery process according to the awareness networking scheme, for example, to discover each other and/or to establish a wireless communication link, e.g., directional and/or high throughput wireless communication link and/or any other link.

In some demonstrative embodiments, devices 102, 115 and/or 140 may be configured to enable time synchronization between device 102, device 115, device 140 and/or one or more other devices, e.g., performing the functionality of Wi-Fi stations (STAs), for example, such that STAs can discover each other more efficiently and/or quickly.

Some demonstrative embodiments are described below with respect to a NAN discovery scheme, and to NAN discovery frames of the NAN discovery scheme. However, in other embodiments, any other discovery scheme and/or discovery frames may be used.

In some demonstrative embodiments, the discovery scheme may include a plurality of contention-based discovery windows (DWs).

In some demonstrative embodiments, communication during the DWs may be configured to enable time synchronization between Wi-Fi stations (STAs), e.g., devices 102, 115 and/or 140, so that STAs can find each other more efficiently during a DW.

In some demonstrative embodiments, devices of an awareness network, e.g. a NAN network, may form one or more clusters, e.g., in order to publish and/or subscribe for services.

In some demonstrative embodiments, devices 102, 115 and/or 140 may form an awareness cluster.

In some demonstrative embodiments, devices 102, 115 and/or 140 may belong to the same awareness cluster.

In some demonstrative embodiments, the awareness cluster may include a NAN cluster.

In some demonstrative embodiments, the NAN cluster may be defined by an Anchor Master (AM). In one example, the AM may include a NAN device, which has the highest rank in the NAN cluster. In other embodiments, the NAN cluster may be defined by any other device, for example, a master device, an anchor device, a manager device, and the like.

In some demonstrative embodiments, NAN data exchange may be reflected by service discovery frames (SDF), e.g., Publish, Subscribe and/or Follow-Up Service discovery frames (SDF). These frames may include public action frames, which may be sent by a device that wishes to publish a service/application, and/or to subscribe to a published service/application at another end.

In one example, one of devices 102, 115 and/or 140, e.g., device 102, may perform the functionality of an AM. The AM may be configured to transmit one or more beacons. Another one of devices 102, 115 and/or 140, e.g., device 140, may be configured to receive and process the beacons.

In one example, devices 102, 115 and/or 140 may perform the functionality of NAN devices, e.g., belonging to a NAN cluster, which may share a common set of NAN parameters, for example, including a common NAN timestamp, and/or a common time period between consecutive discovery windows (DWs), e.g., as described below. The NAN timestamp may be communicated, for example, as part of a NAN beacon frame, which may be communicated in the NAN cluster. In one example, the NAN timestamp may include a Time Synchronization Function (TSF) value, for example, a NAN cluster TSF value, or any other value.

In some demonstrative embodiments, devices 102, 115 and/or 140 may be configured to discover one another over a predefined communication channel ("the social channel"). In one example, the Channel 6 in the 2.4 GHz band may be defined as the NAN social channel. Any other channel may be used as the social channel.

In some demonstrative embodiments, devices 102, 115 and/or 140 may transmit discovery frames, e.g., SDFs, during the plurality of DWs, e.g., over the NAN social channel.

In one example, devices 102, 115 and/or 140 may transmit the discovery frames to discover each other, for example, to enable using the one or more services provided by applications 125, 126 and/or 145.

In some demonstrative embodiments, devices 102, 115 and/or 140 may communicate during a DW according to a contention mechanism. For example, devices 102, 115 and/or 140 may check whether or not a wireless communication channel is unoccupied prior to an attempt to transmit a service discovery frame during the discovery window.

In some demonstrative embodiments, a device of devices 102, 115 and/or 140, e.g., device 102, may not transmit the discovery frame during the DW, e.g., if the channel is occupied. In some demonstrative embodiments, device 102 may transmit the discovery frame during the DW, e.g., if the channel is unoccupied.

In some embodiments, the discovery frame may be transmitted as a group addressed, e.g., broadcast or multicast, discovery frame. In other embodiments, the discovery frame may be transmitted as any other type of frame.

In some demonstrative embodiments, the service discovery frame may not require an acknowledgement frame. According to these embodiments, a transmitter of the service discovery frame may not backoff a transmission of the service discovery frame.

In some demonstrative embodiments, the service discovery frame transmitted by device 102 during the DW may be configured to enable other devices and/or services that are running on other devices to discover services on device 102.

In some demonstrative embodiments, devices of system 100 may utilize availability information, e.g., in the form of an availability interval bitmap and/or a further availability map ("further availability" information), for example, to allow a device of devices 102, 115 and/or 140, to advertise its availability, for example, in terms of at least one channel and one or more timeslots, during which the device may be available, e.g., in an active mode ("awake mode"), for example, to perform post NAN activities.

In one example, the availability information may be communicated as part of an availability attribute of the service discovery frame.

In some demonstrative embodiments, the availability attribute may include, for example, a 32-bit bitmap corresponding to 32 timeslots, e.g., each timeslot is 16 milliseconds (ms) long.

In one example, each bit of the 32-bit bitmap that is not zero may represent a time slot, during which a device sending the availability attribute is to be awake and available during the time slot to send and/or receive data.

In some demonstrative embodiments, it may be inefficient and/or disadvantageous to exchange data between awareness networking devices, for example, by forming a P2P link or another non-NAN link between the devices. For example, a first NAN device that wishes to exchange data with a second NAN device may send to the second NAN device an availability attribute to indicate the channels and the time slots, during which the first device is available to exchange data. The first and second NAN devices may then use a post-discovery method, for example, by using an infrastructure or a peer-to-peer (P2P) network to exchange the data.

In some demonstrative embodiments, devices 102, 115 and/or 140, may be configured to use an awareness networking protocol, for example, the NAN protocol, to exchange data, e.g., in addition to the exchanging of the service discovery frames, for example, even without the need to use a different connection mechanism, for example, even without using a connection via the infrastructure or the P2P network, e.g., as described below.

In some demonstrative embodiments, devices 102, 115 and/or 140 may be configured to exchange data via an awareness networking communication link, for example, a NAN Data Link (NDL).

In some demonstrative embodiments, devices 102, 115 and/or 140 may use the mechanism of the further availability, e.g., as discussed above, for example, to coordinate one or more channels and/or time slots, in which devices 102, 115 and/or 140 may meet to exchange data traffic, e.g., unicast traffic.

In some demonstrative embodiments, it may be advantageous to specify in what conditions two devices, e.g., two NAN devices, should meet in a specific timeslot and a channel, for example, in addition to coordinating between the two devices the specific channel and time slot to exchange data, for example, in order to enable an efficient set up of an awareness networking communication link, e.g., an NDL, between the two devices.

In some demonstrative embodiments, two devices, which are exchanging data, may need to remain at an awake state, for example, during all the time slots, e.g., if the devices do not know if and when data is to be communicated. For example, a NAN device that is awake during a DW, may not know if there is data waiting for the NAN device in buffers of one or more other NAN devices.

Accordingly, if a first NAN device is not informed if and when a second NAN device is to send data to the first NAN device, in order for the first NAN device to be able to receive data, the first NAN device may be required to "participate" in all availability time slots of the second NAN device, e.g., even if the second NAN device has no buffered data to send to the first NAN device. Such a situation may be disadvantageous, for example, as it may lead to inefficient power saving at the first NAN device.

Some demonstrative embodiments may be implemented to enable a first awareness networking device to indicate to one or more second awareness networking devices that the first awareness networking device is to send data to the one or more second awareness networking devices, e.g., as described below. These demonstrative embodiments may enable, for example, an improvement in power saving and/or efficiency of the wireless medium usage, for example, when no redundant or wasted timeslots have to be used.

In some demonstrative embodiments, a NAN device ("the sender NAN device" or "the publisher NAN device"), e.g., device 102, may be configured to send a notification to indicate ("signal") to one or more other NAN devices, that the sender NAN device has buffered data to be transmitted to the one or more other NAN devices, e.g., as described below.

In some demonstrative embodiments, the notification may be communicated during a time slot in which the one or more other NAN devices participate, for example, during a time slot in which the one or more other NAN devices are to be available.

In some demonstrative embodiments, the notification may be communicated during a DW. In other embodiments, the notification may be communicated during any other time slot.

In some demonstrative embodiments, when a NAN device ("the recipient NAN device"), e.g., device 140, that is participating in a DW, receives the notification of buffered data from the sender NAN device, the recipient NAN device may use the availability bitmap of the sender NAN device, for example, in order to "meet" the sender NAN device at a specific channel and time slot and to receive and/or pull the data from the sender NAN device, e.g., as described below.

In some demonstrative embodiments, using the notification that the sender NAN device has buffered data may enable increasing a power saving of a NAN device, for example, by enabling the NAN device to remain in a sleep mode, for example, if the notification does not indicate that the sender NAN device has buffered data pending for the NAN device; and to be available on, e.g., "jump to", the specific channel and time slot advertized by the buffering NAN device, for example, only when the notification indicates that the sender NAN device has buffered data pending for the NAN device.

In some demonstrative embodiments, the notification that the sender NAN device has buffered data may be included in a public action frame.

In some demonstrative embodiments, radio 114 may transmit the public action frame in a DW.

In other embodiments, radio 114 may transmit the public action frame in any other time slot, in which devices of the NAN cluster participate.

In some demonstrative embodiments, the public action frame may include a service discovery frame (SDF).

In some demonstrative embodiments, the service discovery frame may include a NAN service discovery frame.

In some demonstrative embodiments, the NAN SDF may include a publish action frame.

In other embodiments, the public action frame may include any other type of frame, e.g., a dedicated public action frame.

In some demonstrative embodiments, the service discovery frame may include an information element (IE), and availability information, e.g., as descried below.

In some demonstrative embodiments, the IE may include, for example, a Traffic Indication information element (IE).

In one example, the publisher NAN device, e.g., device 102, may append the Traffic Indication information element (IE), e.g., as a new dedicated IE or as part of any other existing IE, for example, in the SDF or in a dedicated public action frame.

In some demonstrative embodiments, the service discovery frame may include, for example, one or more of the following fields:

TABLE 1

| Field | Size (Octets) | Value (Hex) | Description |
| --- | --- | --- | --- |
| Category | 1 | 0x04 | IEEE 802.11 Public Action Frame |
| Action Field | 1 | 0x09 | IEEE 802.11 Public Action Frame Vendor Specific |
| OUI | 3 | 0x50-6F-9A | WFA specific OUI |
| OUI Type | 1 | TBD | Identifying the type and version of the NAN2 |
| OUI Subtype | 1 | | Identifying the type of NAN2 Public action frame. |
| NAN Attributes | Variable | Variable | One or more NAN Attributes |

In some demonstrative embodiments, the NAN attributes field may include, for example, the Traffic Indication information element (IE), for example, in the form of an attribute ("power save attribute"), which may include, for example, the identifiers of one or more devices, e.g., as follows:

TABLE 2

| Field Name | Size (Octets) | Value | Description |
| --- | --- | --- | --- |
| Attribute ID | 1 | 0xE | Identifies the type of NAN attribute. |
| Length | 2 | Variable | N * 6 Bytes where N is the number of Mac address in the attribute |
| Mac address 1 | 6 | Variable | Mac address to which this device has data buffered |
| Mac address 2 | 6 | Variable | Mac address to which this device has data buffered |
| Mac address N | 6 | Variable | Mac address to which this device has data buffered |

In some demonstrative embodiments, the IE may include one or more identifiers to identify one or more wireless devices. For example, the IE may include one or more identifies to identify wireless devices 115 and/or 140.

In some demonstrative embodiments, the one or more wireless devices may include, for example, only wireless devices for which buffered data is pending at device 102, e.g., at application 125.

In some demonstrative embodiments, the IE may include a list of identifiers of NAN devices, for which the publisher NAN device may have some buffered data pending transmission.

In some demonstrative embodiments, the one or more identifiers may include one or more values corresponding to MAC addresses of the one or more wireless devices.

In some demonstrative embodiments, an identifier of a wireless device may include a MAC address of the wireless device, or any other address or value configured to identify the wireless device.

For example, the one or more identifiers may include MAC addresses of devices 140 and 115, for example, if device 102 has buffered data pending for devices 140 and 115.

In another example, the IE may include a compressed list of the MAC addresses, e.g., in order to save space. For example, the compressed list may include a list of hash values of the MAC address, or any other compressed addresses or identifiers.

For example, the one or more identifiers may include hash values and/or compressed values of the MAC addresses of devices 140 and 115, for example, if device 102 has buffered data pending for devices 140 and 115.

In some demonstrative embodiments, the one or more identifiers may include a group address identifier of a group including one or more NAN devices. For example, the one or more identifiers may include a group address identifier of a group including devices 140 and/or 115, for example, if device 102 has buffered data pending for devices 140 and 115.

In some demonstrative embodiments, the availability information may indicate at least one channel, and at least one time slot, e.g., after the DW.

In some demonstrative embodiments, the publisher NAN device, e.g., device 102 may also advertise an availability of the publisher NAN device outside the DWs, for example, using the Availability Attribute, e.g., to enable the wireless devices to exchange data with the publisher NAN device in one or more different time slots and/or channels.

In some demonstrative embodiments, the one or more wireless devices identified by the IE may include devices subscribed to a service provided by application 125 of device 102. For example, the one or more wireless devices identified by the IE transmitted by the publisher NAN device, e.g., device 102, may include devices 115 and/or 140, which may be subscribed to application 125.

In some demonstrative embodiments, a NAN device, e.g., device 140, which subscribes to a service at the publisher NAN device, may be configured to use the availability time slots of the publisher NAN device, for example, only if the NAN device receives a notification that there is some data buffered for it by the publisher NAN device, e.g., as described below.

In some demonstrative embodiments, device 102 may join a NAN cluster, and may publish a service provided by application 125, e.g. a gaming application, and/or any other application or service.

In some demonstrative embodiments, one or more other NAN devices, e.g., device 140, may join the NAN cluster, and may subscribe to the service, e.g., provided by application 125, which may be published by device 102.

In some demonstrative embodiments, the application of the publisher NAN device, e.g., application 125, may be configured to receive and/or process identifiers of the one or more NAN devices, which participate in the NAN cluster and subscribe to the service provided by application 125.

In one example, whenever a NAN device subscribes to the service provided by the application, a database in a server of the application, e.g., on the web or any other server, may be updated with an identifier of the NAN device being subscribed to the service. For example, a database of a server corresponding to application 125 may be updated with an identifier of device 115, for example, if device 115 subscribes to the service of application 125.

In some demonstrative embodiments, the application of the publisher NAN device, e.g., application 125, may be configured to maintain a list of identifiers, e.g., MAC addresses, of devices that are participating in the NAN cluster and have subscribed to the application.

In some demonstrative embodiments, the publisher NAN device, e.g., device 102, may transmit the service discovery frame including one or more identifiers based on the list of identifiers of application 125.

For example, device 102 may transmit a service discovery frame including one or more identifiers, which may include one or more of the MAC addresses in the list of identifiers maintained by application 125.

In some demonstrative embodiments, a NAN device, e.g., device 140, that subscribes to the service, may receive the service discovery frame from the publisher NAN device, for example, device 102, e.g., as described below.

In some demonstrative embodiments, device 140 may receive the SDF including the IE and the availability information from device 102 in the DW.

In some demonstrative embodiments, the IE may include one or more identifiers, for example, to identify only the one or more wireless devices for which buffered data is pending at wireless device 102.

In some demonstrative embodiments, the availability information may indicate a channel and a time slot, for example, after the DW, e.g., as described above.

In some demonstrative embodiments, controller 154 may be configured to switch device 140 between a power save mode and an available mode.

In some demonstrative embodiments, controller 154 may be configured to cause device 140 to be available to receive data from device 102 over the channel during the time slot, for example, when the one or more identifies in the SDF identify device 140.

In some demonstrative embodiments, the NAN device, e.g., device 140, receiving an SDF from the publisher NAN device, e.g., device 102, may be configured to process the IE of the SDF, and to determine whether or not the IE indicates that data for the NAN device is pending transmission at the publisher NAN device.

In some demonstrative embodiments, if the NAN device, e.g., device 104, receiving the SDF, determines that the identifier of the NAN device, e.g., the MAC address or the compressed address of the NAN device, is included in the IE of the SDF, the NAN device may be configured to use the further availability information, for example, which may be included in the SDF, to pull the data from the publisher NAN device, e.g., as described below.

In some demonstrative embodiments, radio 114 may transmit an SDF including an IE, e.g., a Traffic Indication IE, identifying one or more devices, e.g., device 140, and availability information to indicate a time slot and a channel, e.g., e.g., as described above.

In some demonstrative embodiments, radio 114 may send data to the one or more devices, e.g., device 140, indicated by the IE of the SDF, for example, over the channel and during the time slot, which may be indicated by the availability information.

In some demonstrative embodiments, radio 144 may receive the SDF, and controller 154 may process the SDF, and may determine, for example, whether or not device 140 is to be available to receive data from device 102, e.g., based on the IE of the SDF.

In some demonstrative embodiments, controller 154 may cause radio 144 to be available to receive the data from device 102 over the channel and during the time slot, e.g., as indicated by the availability information of the SDF, for example, if the Traffic Indication IE of the SDF identifies device 140.

In some demonstrative embodiments, controller 154 may allow device 140 to be at a power save mode during one or more time slots, e.g., including the time slot indicated by the availability information of the SDF, for example, when the one or more identifiers in the IE of the SDF do not identify device 140.

In some demonstrative embodiments, allowing device 140 to be at the power save mode during one or more time slots, e.g., the timeslot indicated by the availability information of the SDF, may reduce power consumption of device 140 and/or may increase availability of WM 103.

In one example, device 115 may receive the service discovery frame including the IE and the availability information from device 102 in the DW, and the IE may not include an identifier of device 115. According to this example, device 115 may be allowed to be at the power save mode during one or more timeslots indicated by the availability information of the SDF, for example, while other devices, e.g., device 140, is to be available to receive data during the one or more time slots.

In some demonstrative embodiments, devices 140 and/or 115 may be configured to signal device 102 during the time slot indicated by the SDF that devices 104 and/or 115 are ready to receive data from device 102, for example, if the IE in the SDF from device 102 identifies devices 140 and/or 115.

In some demonstrative embodiments, controller 154 may be configured to cause radio 154 to send to wireless device 102 during the time slot indicated by the SDF an indication that device 140 is ready to receive data from device 102, e.g., if the IE in the SDF from device 102 identifies device 140.

In some demonstrative embodiments, the indication may include a Null Data Packet (NDP) transmission from device 140 to 102. In other embodiments, the indication may include any other transmission, frame and/or packet.

In some demonstrative embodiments, the indication may indicate to device 102 that wireless device 140 is ready to receive the data during the time slot.

In some demonstrative embodiments, controller 124 may cause radio 114 to transmit data to wireless device 140, for example, after reception of the indication from wireless device 140 during the time slot.

Figure 2:
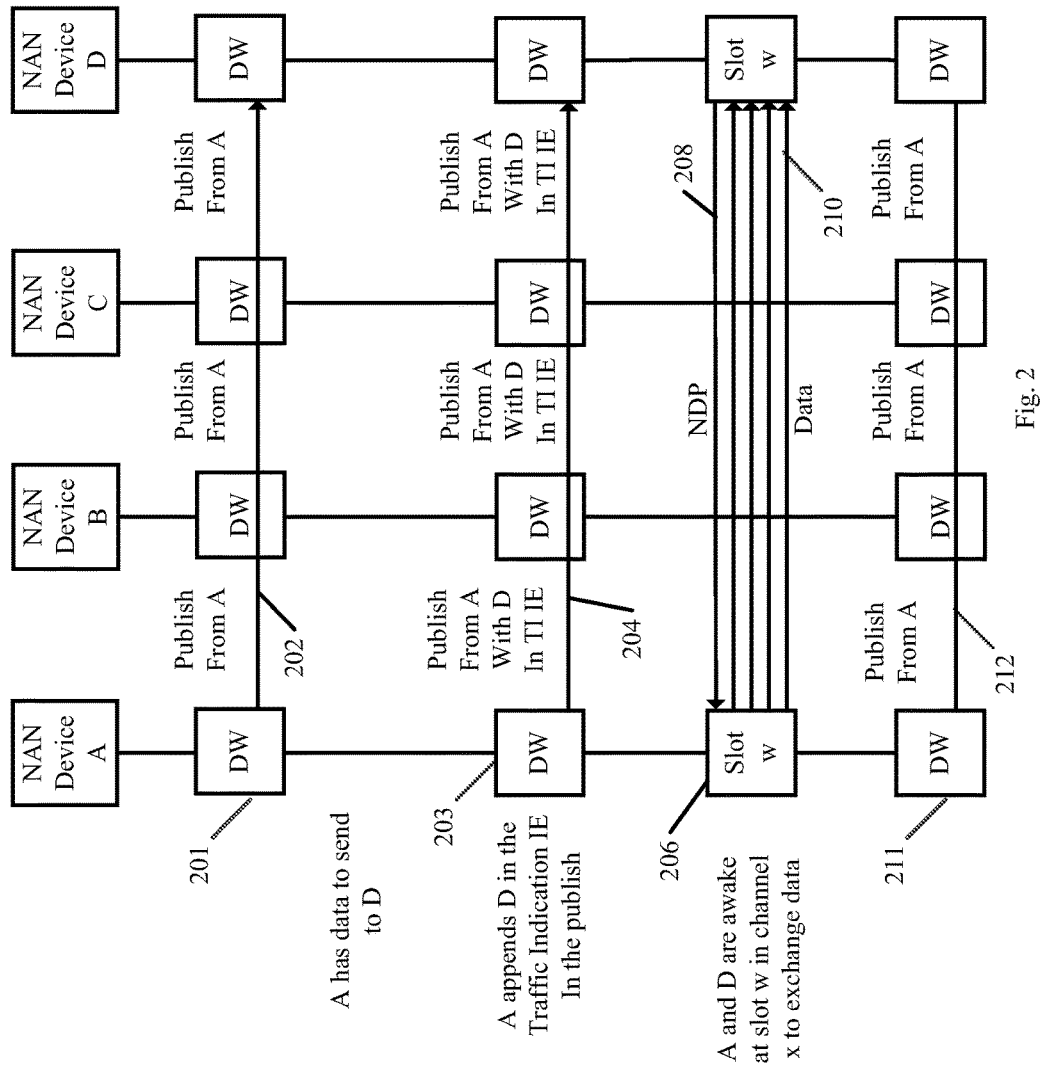
FIG. 2 is a sequence diagram of operations between a plurality of wireless communication devices, in accordance with some demonstrative embodiments.

FIG. 2 is a sequence diagram of operations between a plurality of wireless communication devices, denoted "NAN Device A", "NAN Device B", NAN device C", and "NAN Device D", in accordance with some demonstrative embodiments. In one example, device 102 (FIG. 1) may perform the functionality of NAN Device A, and devices 140 and/or 115 (FIG. 1) may perform the functionality of one of NAN Device B, NAN Device C, and/or NAN Device D.

In some demonstrative embodiments, NAN Device A may join a NAN cluster, and may publish a service/application, e.g., application 125 (FIG. 1), in a NAN cluster DW, for example, using unsolicited, e.g., broadcast, service discovery frames. The NAN Device A may transmit the service discovery frames, for example, in each DW defined for the NAN cluster. For example, as shown in FIG. 2, the NAN Device A may transmit a service discovery frame 202 in a DW 201.

In one example, device 102 (FIG. 1) may transmit the SDFs during each DW defined for the NAN cluster including devices 102, 140 and/or 115 (FIG. 1), e.g., as described above.

In some demonstrative embodiments, NAN Device B, NAN Device C, and NAN Device D may join the same NAN cluster of NAN Device A, and may subscribe to the service/application of NAN Device A.

In some demonstrative embodiments, the MAC addresses of NAN Device B, NAN Device C, and NAN Device D may be stored in the application database corresponding to the service/application, e.g., as described above.

In one example, the MAC addresses of devices 140 and/or 115 (FIG. 1) may be stored in the database corresponding to application 125 (FIG. 1), e.g., as described above.

In some demonstrative embodiments, at some point, the service/application of NAN Device A may have data to be sent to NAN device D, e.g., while no data may be available to send to NAN Device B and/or NAN Device C.

In some demonstrative embodiments, the NAN Device A may query the application database to receive the MAC address of NAN Device D.

In some demonstrative embodiments, the application in NAN Device A, e.g., application 125 (FIG. 1), may call a method in the discovery engine (DE) of NAN device A for sending the data over the NAN protocol to NAN Device D.

In some demonstrative embodiments, the discovery engine in NAN Device A may append the MAC address of NAN Device D to a service discovery frame 204 in a NAN DW 203, for example, in an IE of SDF 204, e.g., as described above.

In one example, device 102 (FIG. 1) may transmit an SDF, e.g., SDF 204, including an IE, e.g., a Traffic Indication IE, including an identifier of device 140 (FIG. 1), for which data may be pending at application 125 (FIG. 1), e.g., as described above.

In some demonstrative embodiments, the NAN Device D may participate in the NAN DW 203 of the cluster, and may receive the SDF 204. The NAN Device D may parse SDF 204, and may identify that the MAC address of the NAN Device D is included in the IE of frame 204.

In some demonstrative embodiments, SDF 204 may include an availability information, e.g., an availability bitmap, including a time slot "w" 206, e.g., a Further Availability time slot, after DW 203.

In some demonstrative embodiments, the availability information may also include a channel "x", in which NAN Device A is to be available to send and receive data.

In some demonstrative embodiments, the NAN Device D may receive SDF 204 and may process SDF 204.

In one example, device 140 (FIG. 1) may receive the SDF from device 102 (FIG. 1) during the DW 203. The SDF may include an IE including the identifier of device 140 (FIG. 1), and the availability information indicating the timeslot w and the channel x, e.g., as described above.

In some demonstrative embodiments, the NAN Device D may use the availability information of the SDF 204 to schedule the time slot "w" 206, and the channel "x".

In some demonstrative embodiments, the NAN Device D may be available to receive data over channel x, e.g., during time slot w.

In one example, controller 154 (FIG. 1) may cause device 140 (FIG. 1) to be available to receive data from device 102 (FIG. 1) during the timeslot w and over the channel x, e.g., as described above.

In some demonstrative embodiments, at timeslot 206, NAN Device A may be available to send the data to NAN Device D. The NAN Device D may send, for example, an indication 208, e.g., a Null Data Packet (NDP), to indicate NAN device D is ready to receive data from NAN Device A.

In one example, controller 154 (FIG. 1) may cause device 140 (FIG. 1) to send indication 208 to device 102 (FIG. 1), for example, to indicate that device 140 (FIG. 1) is ready to receive the data, e.g., as described above.

In some demonstrative embodiments, NAN Device A may send the data 210 to the NAN Device D, e.g., after reception of indication 208.

In some demonstrative embodiments, one or more other NAN devices of the NAN cluster, e.g., NAN Device B and/or NAN Device C, may be allowed to be in a power save mode, e.g., during the timeslot 206 and/or one or more other slots, for example, since NAN devices B and C were not included in the IE of the publish frame 204 sent by the NAN Device A.

In one example, device 115 (FIG. 1) may be allowed to be in the power save mode during the time slot w indicated by the availability information of the SDF 204, for example, if the one or more identifiers in the IE of the SDF 204 do not identify device 115 (FIG. 1), e.g., as described above.

In some demonstrative embodiments, the NAN Device A may transmit one or more additional SDF 222 during one or more subsequent DWs 211.

Figure 3:
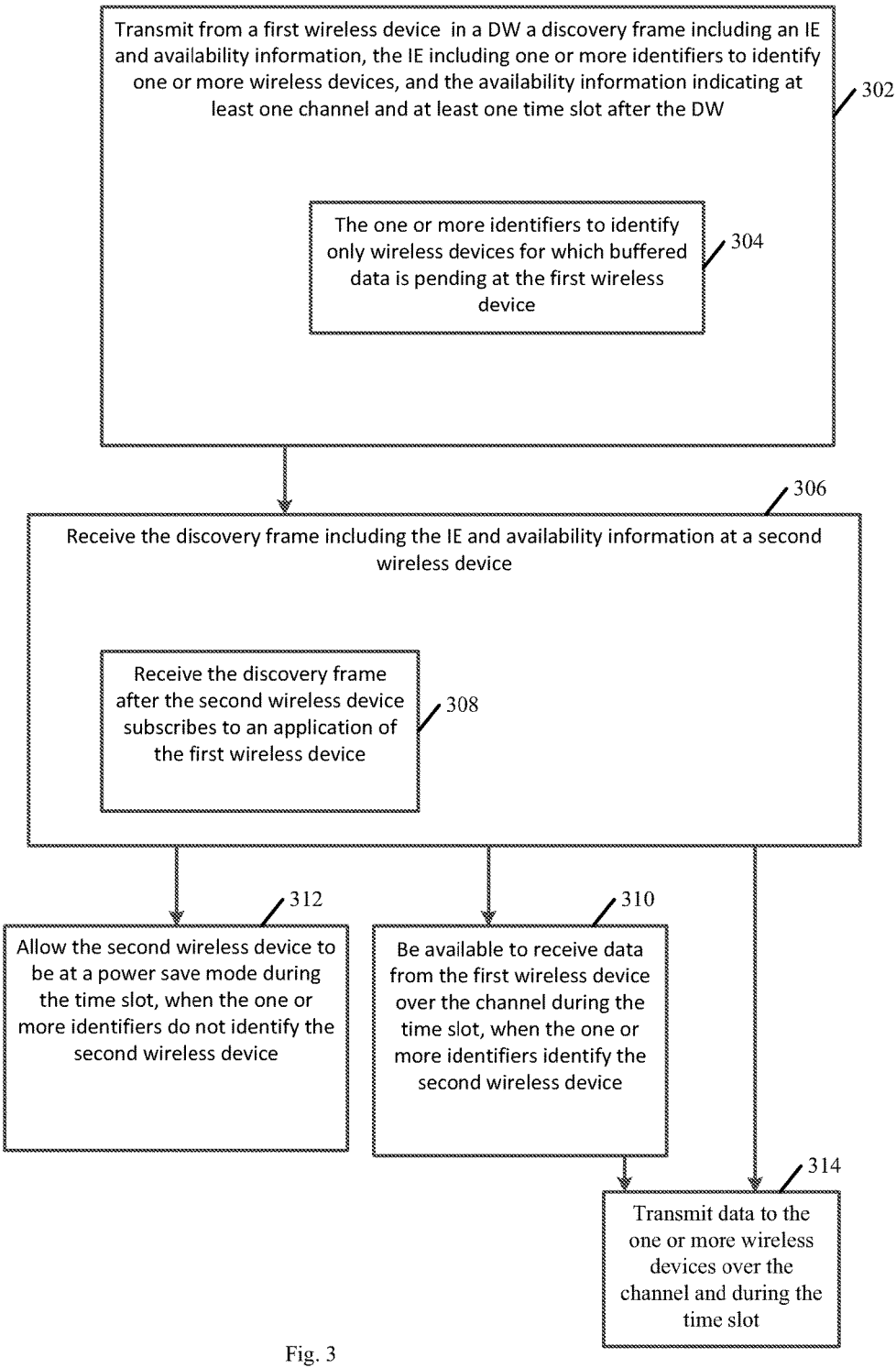
FIG. 3 is a schematic flow-chart illustration of a method of communicating data between awareness networking devices, in accordance with some demonstrative embodiments.

Reference is made to FIG. 3, which schematically illustrates a method of communicating data between awareness networking devices, in accordance with some demonstrative embodiments. For example, one or more of the operations of the method of FIG. 3 may be performed by a wireless communication system, e.g., system 100 (FIG. 1); a wireless device, wireless devices 102, 140 and/or 115 (FIG. 1); a radio, e.g., radios 114 and/or 154 (FIG. 1); a controller, controllers 124 and/or 154 (FIG. 1); and/or a message processor, e.g., message processors 128 and/or 158 (FIG. 1).

As indicated at block 302, the method may include transmitting from a first wireless device a discovery frame in a DW, the discovery frame including an IE and availability information, the IE including one or more identifiers to identify one or more wireless devices, and the availability information indicating at least one channel and at least one time slot after the DW. For example, radio 114 (FIG. 1) may transmit the service discovery frame including the IE and the availability information, e.g., as described above.

As indicated at block 304, transmitting the discovery frame in the DW may include, transmitting the discovery frame including the IE including the one or more identifiers to identify only wireless devices for which buffered data is pending at the first wireless device. For example, radio 114 (FIG. 1) may transmit the service discovery frame including the IE including the one or more identifiers to identify only wireless devices for which buffered data is pending at device 102 (FIG. 1), e.g., as described above.

As indicated at block 306, the method may include receiving the discovery frame including the IE and availability information at a second wireless device. For example, radio 154 (FIG. 1) may receive the discovery frame including the IE and availability information from device 102 (FIG. 1), e.g., as described above.

As indicated at block 308, receiving the discovery frame may include receiving the discovery frame after the second wireless device subscribes to an application of the first wireless device. For example, radio 154 (FIG. 1) may receive the discovery frame after device 140 (FIG. 1) subscribes to application 125 (FIG. 1) of device 102 (FIG. 1), e.g., as described above.

As indicated at block 310, the method may include being available to receive data from the first wireless device over the channel during the time slot, when the one or more identifies identify the second wireless device. For example, device 140 (FIG. 1) may be available to receive data from device 102 (FIG. 1) over the channel during the time slot, for example, when the one or more identifies of the SDF identify device 140 (FIG. 1), e.g., as described above.

As indicated at block 312, the method may include allowing the second wireless device to be at a power save mode during the time slot, for example, when the one or more identifiers do not identify the second wireless device. For example, controller 154 (FIG. 1) may allow device 140 (FIG. 1) to be at the power save mode during the time slot, for example, when the one or more identifies of the SDF do not identify device 140 (FIG. 1), e.g., as described above.

As indicated at block 314, the method may include transmitting data to the one or more wireless devices over the channel and during the time slot. For example, radio 114 (FIG. 1) may transmit the data to the device 140 (FIG. 1) over the channel and during the time slot, e.g., as described above.

Figure 4:
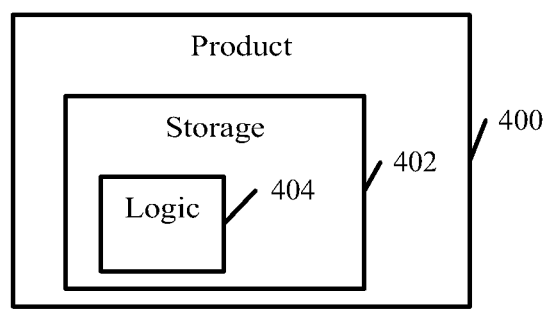
FIG. 4 is a schematic illustration of a product, in accordance with some demonstrative embodiments.

Reference is made to FIG. 4, which schematically illustrates a product of manufacture 400, in accordance with some demonstrative embodiments. Product 400 may include a non-transitory machine-readable storage medium 402 to store logic 404, which may be used, for example, to perform at least part of the functionality of devices 102 (FIG. 1), device 115 and/or 140 (FIG. 1), radios 114 and/or 144 (FIG. 1), transmitters 118 and/or 148 (FIG. 1), receivers 116 and/or 146 (FIG. 1), controllers 124 and/or 154 (FIG. 1), message processors 128 (FIG. 1) and/or 158 (FIG. 1), and/or to perform one or more operations described above with reference to FIGS. 2 and/or 3. The phrase "non-transitory machine-readable medium" is directed to include all computer-readable media, with the sole exception being a transitory propagating signal.

In some demonstrative embodiments, product 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a first wireless device to transmit a service discovery frame in a Discovery Window (DW), the service discovery frame including an information element (IE) and availability information, the IE including one or more identifiers to identify one or more second wireless devices, and the availability information indicating at least one channel and at least one time slot after the DW; and transmit data to the one or more second wireless devices over the channel and during the time slot.

Example 2 includes the subject matter of Example 1, and optionally, wherein the one or more second wireless devices comprise devices subscribed to a service provided by an application of the first wireless device.

Example 3 includes the subject matter of Example 2, and optionally, wherein the one or more identifiers comprise identifiers received from the application.

Example 4 includes the subject matter of any one of Examples 1-3, and optionally, wherein the one or more second devices include only wireless devices for which buffered data is pending at the first wireless device.

Example 5 includes the subject matter of any one of Examples 1-4, and optionally, wherein the one or more identifiers comprise one or more values corresponding to Media Access Control (MAC) addresses of the one or more second wireless devices.

Example 6 includes the subject matter of any one of Examples 1-5, and optionally, wherein the apparatus is configured to cause the first wireless device to transmit the data to a second wireless device of the one or more second wireless devices, after reception of an indication from the second wireless device during the time slot, the indication to indicate the second wireless device is ready to receive the data at the time slot.

Example 7 includes the subject matter of any one of Examples 1-6, and optionally, wherein the first wireless device comprises an awareness networking device.

Example 8 includes the subject matter of any one of Examples 1-7, and optionally, wherein the first wireless device comprises a Neighbor Awareness Networking (NAN) device.

Example 9 includes the subject matter of any one of Examples 1-8, and optionally, wherein the first wireless device and the second wireless devices belong to a same awareness cluster.

Example 10 includes the subject matter of any one of Examples 1-9, and optionally, comprising a transmitter to transmit the service discovery frame and the data.

Example 11 includes the subject matter of any one of Examples 1-10, and optionally, comprising one or more antennas, a memory, and a processor.

Example 12 includes an apparatus comprising logic and circuitry configured to cause a first wireless device to receive a service discovery frame from a second wireless device in a Discovery Window (DW), the service discovery frame including an information element (IE) and availability information, the IE including one or more identifiers to identify one or more wireless devices, and the availability information indicating at least one channel and at least one time slot after the DW; and when the one or more identifiers identify the first wireless device, to be available to receive data from the second wireless device over the channel during the time slot.

Example 13 includes the subject matter of Example 12, and optionally, wherein the apparatus is configured to allow the first wireless device to be at a power save mode during the time slot, when the one or more identifiers do not identify the first wireless device.

Example 14 includes the subject matter of Example 12 or 13, and optionally, wherein the one or more identifiers comprise a value corresponding to a Media Access Control (MAC) address of the first wireless device.

Example 15 includes the subject matter of any one of Examples 12-14, and optionally, wherein the one or more identifiers comprise a group address identifier of a group including the first wireless device.

Example 16 includes the subject matter of any one of Examples 12-15, and optionally, wherein the service discovery frame is to be received after the first wireless device subscribes to an application of the second wireless device.

Example 17 includes the subject matter of any one of Examples 12-16, and optionally, wherein the apparatus is configured to cause the first wireless device to send an indication to the second wireless device during the time slot, the indication indicating the first wireless device is ready to receive the data during the time slot.

Example 18 includes the subject matter of any one of Examples 12-17, and optionally, wherein the one or more identifiers include identifiers of only wireless devices for which buffered data is pending at the first wireless device.

Example 19 includes the subject matter of any one of Examples 12-18, and optionally, wherein the first wireless device and the second wireless device belong to a same awareness cluster.

Example 20 includes the subject matter of any one of Examples 12-19, and optionally, wherein the first wireless device comprises an awareness networking device.

Example 21 includes the subject matter of any one of Examples 12-20, and optionally, wherein the first wireless device comprises a Neighbor Awareness Networking (NAN) device.

Example 22 includes the subject matter of any one of Examples 12-21, and optionally, comprising a receiver to receive the service discovery frame.

Example 23 includes the subject matter of any one of Examples 12-22, and optionally, comprising one or more antennas, a memory, and a processor.

Example 24 includes a system comprising a first wireless device, the first wireless device comprising one or more antennas; a memory; a processor; and a radio to transmit a service discovery frame in a Discovery Window (DW), the service discovery frame including an information element (IE) and availability information, the IE including one or more identifiers to identify one or more second wireless devices, and the availability information indicating at least one channel and at least one time slot after the DW; and to transmit data to the one or more second wireless devices over the channel and during the time slot.

Example 25 includes the subject matter of Example 24, and optionally, wherein the one or more second wireless devices comprise devices subscribed to a service provided by an application of the first wireless device.

Example 26 includes the subject matter of Example 25, and optionally, wherein the one or more identifiers comprise identifiers received from the application.

Example 27 includes the subject matter of any one of Examples 24-26, and optionally, wherein the one or more second devices include only wireless devices for which buffered data is pending at the first wireless device.

Example 28 includes the subject matter of any one of Examples 24-27, and optionally, wherein the one or more identifiers comprise one or more values corresponding to Media Access Control (MAC) addresses of the one or more second wireless devices.

Example 29 includes the subject matter of any one of Examples 24-28, and optionally, wherein the first wireless device is to transmit the data to a second wireless device of the one or more second wireless devices, after reception of an indication from the second wireless device during the time slot, the indication to indicate the second wireless device is ready to receive the data at the time slot.

Example 30 includes the subject matter of any one of Examples 24-29, and optionally, wherein the first wireless device comprises an awareness networking device.

Example 31 includes the subject matter of any one of Examples 24-30, and optionally, wherein the first wireless device comprises a Neighbor Awareness Networking (NAN) device.

Example 32 includes the subject matter of any one of Examples 24-31, and optionally, wherein the first wireless device and the second wireless devices belong to a same awareness cluster.

Example 33 includes a system comprising a first wireless device, the first wireless device comprising one or more antennas; a memory; a processor; and a radio to receive a service discovery frame from a second wireless device in a Discovery Window (DW), the service discovery frame including an information element (IE) and availability information, the IE including one or more identifiers to identify one or more wireless devices, and the availability information indicating at least one channel and at least one time slot after the DW; wherein, when the one or more identifiers identify the first wireless device, the radio is to be available to receive data from the second wireless device over the channel during the time slot.

Example 34 includes the subject matter of Example 33, and optionally, wherein the first wireless device is able to be at a power save mode during the time slot, when the one or more identifiers do not identify the first wireless device.

Example 35 includes the subject matter of Example 33 or 34, and optionally, wherein the one or more identifiers comprise a value corresponding to a Media Access Control (MAC) address of the first wireless device.

Example 36 includes the subject matter of any one of Examples 33-35, and optionally, wherein the one or more identifiers comprise a group address identifier of a group including the first wireless device.

Example 37 includes the subject matter of any one of Examples 33-36, and optionally, wherein the service discovery frame is to be received after the first wireless device subscribes to an application of the second wireless device.

Example 38 includes the subject matter of any one of Examples 33-37, and optionally, wherein the first wireless device is to send an indication to the second wireless device during the time slot, the indication indicating the first wireless device is ready to receive the data during the time slot.

Example 39 includes the subject matter of any one of Examples 33-38, and optionally, wherein the one or more identifiers include identifiers of only wireless devices for which buffered data is pending at the first wireless device.

Example 40 includes the subject matter of any one of Examples 33-39, and optionally, wherein the first wireless device and the second wireless device belong to a same awareness cluster.

Example 41 includes the subject matter of any one of Examples 33-40, and optionally, wherein the first wireless device comprises an awareness networking device.

Example 42 includes the subject matter of any one of Examples 33-41, and optionally, wherein the first wireless device comprises a Neighbor Awareness Networking (NAN) device.

Example 43 includes a method to be performed at a first wireless device, the method comprising transmitting a service discovery frame in a Discovery Window (DW), the service discovery frame including an information element (IE) and availability information, the IE including one or more identifiers to identify one or more second wireless devices, and the availability information indicating at least one channel and at least one time slot after the DW; and transmitting data to the one or more second wireless devices over the channel and during the time slot.

Example 44 includes the subject matter of Example 43, and optionally, wherein the one or more second wireless devices comprise devices subscribed to a service provided by an application of the first wireless device.

Example 45 includes the subject matter of Example 44, and optionally, wherein the one or more identifiers comprise identifiers received from the application.

Example 46 includes the subject matter of any one of Examples 43-45, and optionally, wherein the one or more second devices include only wireless devices for which buffered data is pending at the first wireless device.

Example 47 includes the subject matter of any one of Examples 43-46, and optionally, wherein the one or more identifiers comprise one or more values corresponding to Media Access Control (MAC) addresses of the one or more second wireless devices.

Example 48 includes the subject matter of any one of Examples 43-47, and optionally comprising transmitting the data to a second wireless device of the one or more second wireless devices, after reception of an indication from the second wireless device during the time slot, the indication to indicate the second wireless device is ready to receive the data at the time slot.

Example 49 includes the subject matter of any one of Examples 43-48, and optionally, wherein the first wireless device comprises an awareness networking device.

Example 50 includes the subject matter of any one of Examples 43-49, and optionally, wherein the first wireless device comprises a Neighbor Awareness Networking (NAN) device.

Example 51 includes the subject matter of any one of Examples 43-50, and optionally, wherein the first wireless device and the second wireless devices belong to a same awareness cluster.

Example 52 includes method to be performed at a first wireless device, the method comprising receiving a service discovery frame from a second wireless device in a Discovery Window (DW), the service discovery frame including an information element (IE) and availability information, the IE including one or more identifiers to identify one or more wireless devices, and the availability information indicating at least one channel and at least one time slot after the DW; and when the one or more identifiers identify the first wireless device, being available to receive data from the second wireless device over the channel during the time slot.

Example 53 includes the subject matter of Example 52, and optionally, comprising allowing the first wireless device to be at a power save mode during the time slot, when the one or more identifiers do not identify the first wireless device.

Example 54 includes the subject matter of Example 52 or 53, and optionally, wherein the one or more identifiers comprise a value corresponding to a Media Access Control (MAC) address of the first wireless device.

Example 55 includes the subject matter of any one of Examples 52-54, and optionally, wherein the one or more identifiers comprise a group address identifier of a group including the first wireless device.

Example 56 includes the subject matter of any one of Examples 52-55, and optionally, comprising receiving the service discovery frame after the first wireless device subscribes to an application of the second wireless device.

Example 57 includes the subject matter of any one of Examples 52-56, and optionally, comprising sending an indication to the second wireless device during the time slot, the indication indicating the first wireless device is ready to receive the data during the time slot.

Example 58 includes the subject matter of any one of Examples 52-57, and optionally, wherein the one or more identifiers include identifiers of only wireless devices for which buffered data is pending at the first wireless device.

Example 59 includes the subject matter of any one of Examples 52-58, and optionally, wherein the first wireless device and the second wireless device belong to a same awareness cluster.

Example 60 includes the subject matter of any one of Examples 52-59, and optionally, wherein the first wireless device comprises an awareness networking device.

Example 61 includes the subject matter of any one of Examples 52-60, and optionally, wherein the first wireless device comprises a Neighbor Awareness Networking (NAN) device.

Example 62 includes a product including one or more tangible computer-readable non-transitory storage media comprising computer-executable instructions operable to, when executed by at least one computer processor, enable the at least one computer processor to implement a method at a first wireless device, the method comprising transmitting a service discovery frame in a Discovery Window (DW), the service discovery frame including an information element (IE) and availability information, the IE including one or more identifiers to identify one or more second wireless devices, and the availability information indicating at least one channel and at least one time slot after the DW; and transmitting data to the one or more second wireless devices over the channel and during the time slot.

Example 63 includes the subject matter of Example 62, and optionally, wherein the one or more second wireless devices comprise devices subscribed to a service provided by an application of the first wireless device.

Example 64 includes the subject matter of Example 63, and optionally, wherein the one or more identifiers comprise identifiers received from the application.

Example 65 includes the subject matter of any one of Examples 62-64, and optionally, wherein the one or more second devices include only wireless devices for which buffered data is pending at the first wireless device.

Example 66 includes the subject matter of any one of Examples 62-65, and optionally, wherein the one or more identifiers comprise one or more values corresponding to Media Access Control (MAC) addresses of the one or more second wireless devices.

Example 67 includes the subject matter of any one of Examples 62-66, and optionally, wherein the method comprises transmitting the data to a second wireless device of the one or more second wireless devices, after reception of an indication from the second wireless device during the time slot, the indication to indicate the second wireless device is ready to receive the data at the time slot.

Example 68 includes the subject matter of any one of Examples 62-67, and optionally, wherein the first wireless device comprises an awareness networking device.

Example 69 includes the subject matter of any one of Examples 62-68, and optionally, wherein the first wireless device comprises a Neighbor Awareness Networking (NAN) device.

Example 70 includes the subject matter of any one of Examples 62-69, and optionally, wherein the first wireless device and the second wireless devices belong to a same awareness cluster.

Example 71 includes product including one or more tangible computer-readable non-transitory storage media comprising computer-executable instructions operable to, when executed by at least one computer processor, enable the at least one computer processor to implement a method at a first wireless device, the method comprising receiving a service discovery frame from a second wireless device in a Discovery Window (DW), the service discovery frame including an information element (IE) and availability information, the IE including one or more identifiers to identify one or more wireless devices, and the availability information indicating at least one channel and at least one time slot after the DW; and when the one or more identifiers identify the first wireless device, being available to receive data from the second wireless device over the channel during the time slot.

Example 72 includes the subject matter of Example 71, and optionally, wherein the method comprises allowing the first wireless device to be at a power save mode during the time slot, when the one or more identifiers do not identify the first wireless device.

Example 73 includes the subject matter of Example 71 or 72, and optionally, wherein the one or more identifiers comprise a value corresponding to a Media Access Control (MAC) address of the first wireless device.

Example 74 includes the subject matter of any one of Examples 71-73, and optionally, wherein the one or more identifiers comprise a group address identifier of a group including the first wireless device.

Example 75 includes the subject matter of any one of Examples 71-74, and optionally, wherein the method comprises receiving the service discovery frame after the first wireless device subscribes to an application of the second wireless device.

Example 76 includes the subject matter of any one of Examples 71-75, and optionally, wherein the method comprises sending an indication to the second wireless device during the time slot, the indication indicating the first wireless device is ready to receive the data during the time slot.

Example 77 includes the subject matter of any one of Examples 71-76, and optionally, wherein the one or more identifiers include identifiers of only wireless devices for which buffered data is pending at the first wireless device.

Example 78 includes the subject matter of any one of Examples 71-77, and optionally, wherein the first wireless device and the second wireless device belong to a same awareness cluster.

Example 79 includes the subject matter of any one of Examples 71-78, and optionally, wherein the first wireless device comprises an awareness networking device.

Example 80 includes the subject matter of any one of Examples 71-79, and optionally, wherein the first wireless device comprises a Neighbor Awareness Networking (NAN) device.

Example 81 includes an apparatus of wireless communication, the apparatus comprising means for transmitting a service discovery frame from a first wireless device in a Discovery Window (DW), the service discovery frame including an information element (IE) and availability information, the IE including one or more identifiers to identify one or more second wireless devices, and the availability information indicating at least one channel and at least one time slot after the DW; and means for transmitting data to the one or more second wireless devices over the channel and during the time slot.

Example 82 includes the subject matter of Example 81, and optionally, wherein the one or more second wireless devices comprise devices subscribed to a service provided by an application of the first wireless device.

Example 83 includes the subject matter of Example 82, and optionally, wherein the one or more identifiers comprise identifiers received from the application.

Example 84 includes the subject matter of any one of Examples 81-83, and optionally, wherein the one or more second devices include only wireless devices for which buffered data is pending at the first wireless device.

Example 85 includes the subject matter of any one of Examples 81-84, and optionally, wherein the one or more identifiers comprise one or more values corresponding to Media Access Control (MAC) addresses of the one or more second wireless devices.

Example 86 includes the subject matter of any one of Examples 81-85, and optionally, comprising means for transmitting the data to a second wireless device of the one or more second wireless devices, after reception of an indication from the second wireless device during the time slot, the indication to indicate the second wireless device is ready to receive the data at the time slot.

Example 87 includes the subject matter of any one of Examples 81-86, and optionally, wherein the first wireless device comprises an awareness networking device.

Example 88 includes the subject matter of any one of Examples 81-87, and optionally, wherein the first wireless device comprises a Neighbor Awareness Networking (NAN) device.

Example 89 includes the subject matter of any one of Examples 81-88, and optionally, wherein the first wireless device and the second wireless devices belong to a same awareness cluster.

Example 90 includes an apparatus of wireless communication, the apparatus comprising means for receiving at a first wireless device a service discovery frame from a second wireless device in a Discovery Window (DW), the service discovery frame including an information element (IE) and availability information, the IE including one or more identifiers to identify one or more wireless devices, and the availability information indicating at least one channel and at least one time slot after the DW; and means for, when the one or more identifiers identify the first wireless device, being available to receive data from the second wireless device over the channel during the time slot.

Example 91 includes the subject matter of Example 90, and optionally, comprising means for allowing the first wireless device to be at a power save mode during the time slot, when the one or more identifiers do not identify the first wireless device.

Example 92 includes the subject matter of Example 90 or 91, and optionally, wherein the one or more identifiers comprise a value corresponding to a Media Access Control (MAC) address of the first wireless device.

Example 93 includes the subject matter of any one of Examples 90-92, and optionally, wherein the one or more identifiers comprise a group address identifier of a group including the first wireless device.

Example 94 includes the subject matter of any one of Examples 90-93, and optionally, comprising means for receiving the service discovery frame after the first wireless device subscribes to an application of the second wireless device.

Example 95 includes the subject matter of any one of Examples 90-94, and optionally, comprising means for sending an indication to the second wireless device during the time slot, the indication indicating the first wireless device is ready to receive the data during the time slot.

Example 96 includes the subject matter of any one of Examples 90-95, and optionally, wherein the one or more identifiers include identifiers of only wireless devices for which buffered data is pending at the first wireless device.

Example 97 includes the subject matter of any one of Examples 90-96, and optionally, wherein the first wireless device and the second wireless device belong to a same awareness cluster.

Example 98 includes the subject matter of any one of Examples 90-97, and optionally, wherein the first wireless device comprises an awareness networking device.

Example 99 includes the subject matter of any one of Examples 90-98, and optionally, wherein the first wireless device comprises a Neighbor Awareness Networking (NAN) device.

Functions, operations, components and/or features described herein with reference to one or more embodiments, may be combined with, or may be utilized in combination with, one or more other functions, operations, components and/or features described herein with reference to one or more other embodiments, or vice versa.

While certain features of have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a first wireless device to:
   transmit a service discovery frame in a Discovery Window (DW), the service discovery frame comprising an information element (IE) and availability information, said IE is to identify only wireless devices for which buffered data is pending at said first wireless device, the IE comprising one or more identifiers to identify one or more second wireless devices for which data is buffered at said first wireless device, and the availability information indicating at least one channel and at least one time slot after said DW;
   receive from a second wireless device of the one or more second wireless devices an indication over the channel and during the time slot, the indication to indicate said second wireless device is available to receive at said time slot data buffered for the second wireless device; and
   transmit the data buffered for the second wireless device over the channel and during the time slot.

2. The apparatus of claim 1, wherein the one or more second wireless devices comprise devices subscribed to a service provided by an application of said first wireless device.

3. The apparatus of claim 2, wherein the one or more identifiers comprise identifiers received from said application.

4. The apparatus of claim 1, wherein the one or more identifiers comprise one or more values corresponding to Media Access Control (MAC) addresses of the one or more second wireless devices.

5. The apparatus of claim 1, wherein said first wireless device comprises an awareness networking device.

6. The apparatus of claim 1, wherein said first wireless device comprises a Neighbor Awareness Networking (NAN) device.

7. The apparatus of claim 1, wherein said first wireless device and said second wireless devices belong to a same Neighbor Awareness Networking (NAN) cluster.

8. The apparatus of claim 1 comprising a transmitter to transmit said service discovery frame and said data.

9. The apparatus of claim 1 comprising one or more antennas, a memory, and a processor.

10. An apparatus comprising logic and circuitry configured to cause a first wireless device to:
    receive a service discovery frame from a second wireless device in a Discovery Window (DW), the service discovery frame comprising an information element (IE) and availability information, the IE comprising one or more identifiers to identify one or more wireless devices for which data is buffered at said second wireless device, said one or more identifiers including identifiers of only wireless devices for which buffered data is pending at said second wireless device, and the availability information indicating at least one channel and at least one time slot after said DW;
    when said one or more identifiers identify said first wireless device, cause said first wireless device to be available to receive from said second wireless device over the channel during said time slot data buffered for the first wireless device; and when said one or more identifiers do not identify said first wireless device, allow said first wireless device to be at a power save mode during said time slot.

11. The apparatus of claim 10, wherein said first wireless device and said second wireless device belong to a same Neighbor Awareness Networking (NAN) cluster.

12. The apparatus of claim 10, wherein said one or more identifiers comprise a value corresponding to a Media Access Control (MAC) address of said first wireless device.

13. The apparatus of claim 10, wherein said one or more identifiers comprise a group address identifier of a group including said first wireless device.

14. The apparatus of claim 10, wherein said service discovery frame is to be received after said first wireless device subscribes to an application of said second wireless device.

15. The apparatus of claim 10 configured to cause said first wireless device to send an indication to said second wireless device over the channel and during said time slot, the indication indicating said first wireless device is available to receive during said time slot the data buffered for the first wireless device.

16. The apparatus of claim 10 comprising one or more antennas, a memory, and a processor.

17. A product comprising one or more tangible computer-readable non-transitory storage media comprising computer-executable instructions operable to, when executed by at least one processor, enable the at least one processor to cause a first wireless device to:

transmit a service discovery frame in a Discovery Window (DW), the service discovery frame comprising an information element (IE) and availability information, said IE is to identify only wireless devices for which buffered data is pending at said first wireless device, the IE comprising one or more identifiers to identify one or more second wireless devices for which data is buffered at said first wireless device, and the availability information indicating at least one channel and at least one time slot after said DW;

receive from a second wireless device of the one or more second wireless devices an indication over the channel and during the time slot, the indication to indicate said second wireless device is available to receive at said time slot data buffered for the second wireless device; and transmit the data buffered for the second wireless device over the channel and during the time slot.

18. The product of claim 17, wherein the one or more second wireless devices comprise devices subscribed to a service provided by an application of said first wireless device.

19. The product of claim 17, wherein said first wireless device and said second wireless devices belong to a same Neighbor Awareness Networking (NAN) cluster.

20. A product comprising one or more tangible computer-readable non-transitory storage media comprising computer-executable instructions operable to, when executed by at least one processor, enable the at least one processor to cause a first wireless device to:

receive a service discovery frame from a second wireless device in a Discovery Window (DW), the service discovery frame comprising an information element (IE) and availability information, the IE comprising one or more identifiers to identify one or more wireless devices for which data is buffered at said second wireless device, said one or more identifiers including identifiers of only wireless devices for which buffered data is pending at said second wireless device, and the availability information indicating at least one channel and at least one time slot after said DW;

when said one or more identifiers identify said first wireless device, be available to receive from said second wireless device over the channel during said time slot data buffered for the first wireless device; and when said one or more identifiers do not identify said first wireless device, allow said first wireless device to be at a power save mode during said time slot.

21. The product of claim 20, wherein said one or more identifiers comprise a value corresponding to a Media Access Control (MAC) address of said first wireless device.

22. The product of claim 20, wherein said instructions, when executed, cause said first wireless device to receive said service discovery frame after said first wireless device subscribes to an application of said second wireless device.

* * * * *

UNITED STATES PATENT AND TRADEMARK OFFICE
CERTIFICATE OF CORRECTION

PATENT NO. : 9,801,039 B2
APPLICATION NO. : 14/670503
DATED : October 24, 2017
INVENTOR(S) : Elad Oren et al.

It is certified that error appears in the above-identified patent and that said Letters Patent is hereby corrected as shown below:

On the Title Page

Item (54), and in the Specification, Column 1, Line 2, delete "APPARATUS, SYSTEM AND METHOD OF COMMUNICATION DATA BETWEEN AWARENESS NETWORKING DEVICES" and insert -- APPARATUS, SYSTEM AND METHOD OF COMMUNICATING DATA BETWEEN AWARENESS NETWORKING DEVICES --, therefor.

Signed and Sealed this
Nineteenth Day of June, 2018

Andrei Iancu
*Director of the United States Patent and Trademark Office*